United States Patent
Krüger et al.

(10) Patent No.: US 9,567,424 B2
(45) Date of Patent: Feb. 14, 2017

(54) REACTIVE LIQUID RUBBER MADE OF BLOCKED ISOCYANATE-TERMINATED PREPOLYMERS WITH GLYCOL SCAVENGER

(71) Applicant: SIKA TECHNOLOGY AG, Baar (CH)

(72) Inventors: Christian Krüger, Schlieren (CH); Jan Olaf Schulenburg, Uster (CH); David Hofstetter, Winterthur (CH); Tina Voci, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/440,300

(22) PCT Filed: Nov. 7, 2013

(86) PCT No.: PCT/EP2013/073298
§ 371 (c)(1),
(2) Date: May 1, 2015

(87) PCT Pub. No.: WO2014/072426
PCT Pub. Date: May 15, 2014

(65) Prior Publication Data
US 2015/0337181 A1 Nov. 26, 2015

(30) Foreign Application Priority Data

Nov. 12, 2012 (EP) .................... 12192265

(51) Int. Cl.
| | | |
|---|---|---|
| C08G 18/10 | (2006.01) | |
| C08G 18/83 | (2006.01) | |
| C08G 18/84 | (2006.01) | |
| C08L 63/00 | (2006.01) | |
| C08L 63/02 | (2006.01) | |
| C08L 63/04 | (2006.01) | |
| C08L 75/04 | (2006.01) | |
| C08L 75/06 | (2006.01) | |
| C08L 75/08 | (2006.01) | |
| C09J 163/00 | (2006.01) | |
| C09J 163/02 | (2006.01) | |
| C09J 163/04 | (2006.01) | |
| C09J 175/04 | (2006.01) | |
| C09J 175/06 | (2006.01) | |
| C09J 175/08 | (2006.01) | |
| C08G 18/12 | (2006.01) | |
| C08G 18/75 | (2006.01) | |
| C08G 59/06 | (2006.01) | |
| C08G 59/28 | (2006.01) | |
| C08G 59/32 | (2006.01) | |

(52) U.S. Cl.
CPC ............ *C08G 18/10* (2013.01); *C08G 18/12* (2013.01); *C08G 18/755* (2013.01); *C08G 18/831* (2013.01); *C08G 18/84* (2013.01); *C08G 59/066* (2013.01); *C08G 59/28* (2013.01); *C08G 59/3227* (2013.01); *C08L 63/00* (2013.01); *C08L 75/04* (2013.01); *C08L 75/06* (2013.01); *C08L 75/08* (2013.01); *C09J 163/00* (2013.01); *C09J 163/04* (2013.01); *C09J 175/04* (2013.01); *C09J 175/06* (2013.01); *C09J 175/08* (2013.01)

(58) Field of Classification Search
None
See application file for complete search history.

(56) References Cited

U.S. PATENT DOCUMENTS

| | | | |
|---|---|---|---|
| 4,952,645 | A | 8/1990 | Mulhaupt et al. |
| 5,290,857 | A | 3/1994 | Ashida et al. |
| 2007/0066721 | A1 | 3/2007 | Kramer et al. |
| 2007/0105983 | A1 | 5/2007 | Kramer et al. |
| 2009/0029059 | A1 | 1/2009 | Stanley et al. |
| 2009/0288766 | A1 | 11/2009 | Kramer et al. |
| 2015/0099128 | A1* | 4/2015 | Harkal ............ C08G 18/10 428/423.1 |

FOREIGN PATENT DOCUMENTS

| | | |
|---|---|---|
| EP | 0353190 B1 | 3/1995 |
| EP | 1431325 A1 | 6/2004 |
| EP | 1498441 A1 | 1/2005 |
| EP | 1574537 A1 | 9/2005 |
| EP | 1602702 A1 | 12/2005 |
| EP | 1916272 A1 | 4/2008 |
| FR | 1531824 | 3/1925 |
| WO | 2004055092 A1 | 7/2004 |
| WO | 2005007720 A1 | 1/2005 |

OTHER PUBLICATIONS

Jan. 21, 2014 International Search Report issued in International Application No. PCT/EP2013/073298.
May 12, 2015 International Preliminary Report issued in International Application No. PCT/EP2013/073298.

* cited by examiner

*Primary Examiner* — Robert Sellers
(74) *Attorney, Agent, or Firm* — Oliff PLC

(57) ABSTRACT

A method is described for producing liquid rubber containing an impact-resistance modifier terminated by epoxy groups, the method including the reaction of an isocyanate-terminated prepolymer with an epoxy resin, which includes an epoxy compound including a primary or secondary hydroxyl group, in the presence of a compound selected from anhydrides, ketones and aldehydes as glycol scavengers, wherein the isocyanate-terminated prepolymer, the epoxy resin and the glycol scavenger are mixed with one another, or the epoxy resin is reacted with the glycol scavenger, before they are mixed with the isocyanate-terminated prepolymer. Gelling in the reaction mixture is avoided by the method. The resulting products are suitable for improving the impact resistance of epoxy resin compositions, particularly one-component or two-component epoxy resin adhesives.

17 Claims, No Drawings

REACTIVE LIQUID RUBBER MADE OF BLOCKED ISOCYANATE-TERMINATED PREPOLYMERS WITH GLYCOL SCAVENGER

TECHNICAL FIELD

The invention relates to a method for producing a liquid rubber containing an impact-resistance modifier terminated by an epoxy group, the liquid rubber obtainable therefrom, its use and one-component or two-component epoxy resin compositions containing said liquid rubber, which are preferably adhesives.

PRIOR ART

In the production of both vehicles and mounted parts or machinery and instruments increasingly high quality adhesives are used in place of or in combination with conventional joining techniques such as screwing, riveting, punching or welding. This creates advantages and new opportunities in production, for example the production of composite and hybrid materials, or greater freedom in the design of components. For an application in vehicle manufacture the adhesives must exhibit good adhesion to all substrates used, in particular electrolytically galvanized, hot dip galvanized, and subsequently phosphated steel sheets, oiled steel sheets and on various optionally surface-treated aluminum alloys. These good adhesion characteristics must be maintained especially after aging (alternating climate, salt spray, etc.) without much loss of quality. When the adhesives are used as structural adhesives in automobile manufacture, the resistance of these adhesives to cleaning baths and dip coating (so-called leaching resistance) is of great importance to ensure press reliability at the manufacturer.

In the case of one-component adhesives the structural adhesives should cure under the usual baking conditions of ideally 30 min at 180° C. In the case of two-component adhesives, the curing should occur at room temperature over the course of several days to about 1 week; however, an accelerated curing regimen such as, e.g., 4 h at r.t. followed by 30 min at 60° C. or 85° C. should also be applicable. In addition, however, they should also be stable to about 220° C. Further requirements for such a cured adhesive or bonding include ensuring process reliability at both high temperatures to about 90° C. and at low temperatures to about −40° C. Since these are structural adhesives and therefore these adhesives are bonding structural parts, high strength and impact resistance of the adhesive are of utmost importance.

Conventional epoxy adhesives are indeed distinguished by a high mechanical strength, in particular high tensile strength. Upon abrupt stress of the bonding, however, classical epoxy adhesives are usually too brittle and therefore by far do not meet the requirements, in particular of the automobile industry, under crash conditions where both large tensile and peel stresses occur. In this respect the strength at high, however, in particular at low temperatures (for example <−10° C.) are often particularly unsatisfactory.

From the literature, two methods are known as to how to reduce the brittleness of epoxy adhesives and thus to increase their impact strength: on the one hand, this object can be achieved by the addition of at least partially crosslinked high molecular compounds such as latices of core/shell polymers or other flexibilizing polymers and copolymers.

Such a method is described, e.g., in U.S. Pat. No. 5,290,857. On the other hand, by introducing soft segments, e.g., by the corresponding modification of the epoxy components, a certain increase in toughness can be achieved. Thus, U.S. Pat. No. 4,952,645 describes epoxy resin compositions which were flexibilized by reaction with carboxylic acids, in particular di- or trimeric fatty acids, as well as with carboxylic acid-terminated diols.

EP 0353190 A2 relates to a flexibilizing component for epoxy resins based on monophenol- or epoxy-terminated polymers. EP 1574537 A1 and EP 1602702 A1 describe epoxy adhesive compositions containing monophenol- or epoxy-terminated polymers as impact resistant agent.

WO 2004/055092 A1 describes heat-curing epoxy resin compositions with improved impact strength by using an epoxy-group-terminated impact-resistance modifier in the epoxy adhesive, wherein the impact strength modifier is obtained by reaction of an isocyanate-terminated prepolymer with hydroxyl-terminated epoxy compounds.

WO 2005/007720 A1 describes epoxy group-terminated impact-resistance modifiers which are obtained by reacting an isocyanate-terminated prepolymer with hydroxyl-terminated epoxy compounds, wherein the impact-resistance modifier has at least one aromatic structural element which is incorporated into the polymer chain via urethane groups.

US 2009/0029059 A1 describes epoxy compositions which are suitable for the coating of water pipes. The composition comprises an epoxy resin, an anhydride and a curing agent. The epoxy resin compositions contain bis-α-glycols that have no epoxy groups and therefore do not react with the matrix. For this reason the bis-α-glycols can be washed out of the coatings, which constitutes a health hazard. Therefore, a process is described also wherein bis-α-glycols existing in an epoxy resin are converted by reacting with anhydride in order to be able to react with the matrix.

FR 1531824 A relates to the preparation of a polyepoxy from the reaction of an isocyanate-functional polyurethane with an epoxy alcohol. The resulting product may then be cured with a hardener such as an anhydride.

EP 1916272 A1, EP 1431325 A1 and EP 1498441 A1 describe compositions containing an epoxy group-terminated polyurethane prepolymer which is obtained by reacting an isocyanate-containing polyurethane prepolymer with a hydroxyl group-containing epoxy compound.

By using epoxy group-terminated impact-resistance modifiers, such as those described in WO 2004/055092 A1 or WO 2005/007720 A1 discussed above, a significantly improved impact strength can be achieved for one-component or two-component epoxy resin adhesives. Many epoxy resins contain as a by-product of the synthesis or, preferably, in a targeted manner, epoxy compounds having primary or secondary hydroxyl groups. It would therefore be desirable to form epoxy-terminated impact-resistance modifiers by reacting iscocyanate-terminated prepolymers with such epoxy resins.

In the synthesis of epoxy resins, however, numerous epoxides and glycols are formed as by-products in addition to the target compounds. For producing reactive liquid rubbers these by-products do not have to be separated, however, the retention in the system limits the freedom to further formulation, since the glycols contained in epoxy resins as a minor component can lead to gelling of the epoxy resin-terminated impact-resistance modifiers due to their increased functionality. Presumably, bifunctional OH-containing species and/or particularly reactive OH-containing species, in particular mono-alpha-glycols, which are present as minor components are responsible for the gelling observed for epoxy resin-terminated impact-resistance modifiers due to their increased functionality.

As a result, the production of epoxy group-terminated impact-resistance modifiers based on epoxy resins, therefore, often leads to gelling and to inhomogeneities of the polymer, so that processing is difficult.

DESCRIPTION OF THE INVENTION

Object of the present invention is to provide impact-resistance modifiers for epoxy resin compositions which do not have the issues of gelation and formation of inhomogeneities, to thereby increase process reliability. Preferably, they are suitable as part of one-component or two-component epoxy resin compositions, in particular adhesives.

The object is surprisingly achieved by a method for producing a liquid rubber containing an epoxy group-terminated impact resistance modifier, comprising reacting an isocyanate-terminated prepolymer of formula (II)

(II)

wherein $X_1$=O, S or NH;
$Y_1$ represents an n-valent radical of a reactive polymer after removal of terminal amino, thiol or hydroxyl groups;
$Y_2$ represents a divalent radical of aliphatic, cycloaliphatic aromatic, or araliphatic diisocyanates after removal of the isocyanate groups, or a trivalent radical of trimers or biurets of aliphatic, cycloaliphatic, aromatic or araliphatic diisocyanates after removal of the isocyanate groups;
m=1 or 2; and
n=2, 3 or 4; preferably 2 or 3,
with an epoxy resin, comprising an epoxy compound containing a primary or secondary hydroxyl group of formula (III)

(III)

wherein $Y_3$ represents a radical of an aliphatic, cycloaliphatic, aromatic or araliphatic epoxy containing a primary or secondary hydroxyl group after removal of the epoxide groups and the primary or secondary hydroxyl group; and
q=1, 2 or 3;
in the presence of at least one compound selected from anhydrides, ketones, and aldehydes as glycol scavenger, wherein the isocyanate-terminated prepolymer of formula (II), the epoxy resin and the glycol scavenger are mixed with one another or the epoxy resin is reacted with the glycol scavenger before they are mixed with the isocyanate-terminated prepolymer of formula (II).

Theoretically, the glycol scavengers can react with all possible groups in the epoxy resin (OH, epoxides) and in the final adhesive formulation additionally with amines used for curing and therefore can lead to a variety of possible species. It was therefore surprising that they seem to selectively block only the glycols contained in the epoxy resin enabling such production from the viewpoint of process technology in the first place.

Prepolymers are oligomeric or already polymeric compounds, which serve as precursors or intermediates for the synthesis of high molecular weight substances. The prefix "poly" in expressions such as polyol or polyisocyanate means that the compound has two or more of said groups; a polyol is thus a compound having two or more hydroxyl groups.

The liquid rubber produced according to the invention contains one or more epoxy group-terminated impact-resistance modifiers. The liquid rubber is a reactive liquid rubber. The epoxy group-terminated impact-resistance modifiers include fully blocked or partially blocked isocyanate-terminated prepolymers. The isocyanate-terminated prepolymers are referred to herein as PU polymers.

The isocyanate-terminated prepolymers or PU polymers of the formula (II) used are the reaction product of one or more $X_1$H-group-bearing compounds with one or more polyisocyanates. The reaction can be carried out in one step or in several steps. The isocyanate-terminated prepolymers of formula (II) used can be, for example, the reaction product of $X_1$H-group-bearing compounds of formula (IV) and polyisocyanates of formula (V) wherein the substituents and indices are defined in the same manner as in formula (II).

(IV)

(V)

The compounds of formula (IV) have $X_1$H groups. These may be independently of one another OH, SH, $NH_2$. Amine and hydroxyl group are preferred, with the hydroxyl group being particularly preferred. The $X_1$H-group-bearing compounds of formula (IV) may be prepolymers or polymers.

Preferred compounds of formula (IV) are polyols, for example, the following commercial polyols or any mixtures thereof:

Polyoxyalkylene polyols, also called polyether polyols, which are the polymerization product of ethylene oxide, 1,2-propylene oxide, 1,2- or 2,3-butylene oxide, tetrahydrofuran, or mixtures thereof, optionally polymerized using a starter molecule having two or three active H atoms such as, for example, water or compounds having two or three OH groups. Both polyoxyalkylene polyols which have a low degree of unsaturation (measured according to ASTM D-2849-69 and expressed in milliequivalents of unsaturation per gram of polyol (meq/g)), prepared, for example, with the aid of so-called double metal cyanide complex catalysts (short DMC catalysts), and polyoxyalkylene polyols with a higher degree of unsaturation, prepared, for example, with the aid of anionic catalysts such as NaOH, KOH or alkali metal alkoxides, can be used. Especially suitable are polyoxypropylene diols and triols, and in particular with a degree of unsaturation of less than 0.02 meq/g and/or having a molecular weight in the range of 1000 to 30,000 g/mol, polyoxybutylene diols and triols, polyoxypropylene diols and triols, in particular with a molecular weight of 400 to 8000 g/mol, and so-called "EO-endcapped" (provided with ethylene oxide end groups) polyoxypropylene diols or triols. The latter are specific polyoxypropylene polyoxyethylene polyols that are obtained, for example, by alkoxylating pure polyoxypropylene polyols with ethylene oxide following the completion of the polypropoxylation, and thus have primary hydroxyl groups;

polyester polyols, produced for example from dihydric to trihydric alcohols such as, for example, 1,2-ethane diol, diethylene glycol, 1,2-propane diol, dipropylene glycol, 1,4-butane diol, 1,5-pentane diol, 1,6-hexane diol, neopentyl glycol, glycerol, 1,1,1-trimethylolpropane or mixtures of the aforementioned alcohols with organic dicarboxylic acids or the anhydrides or esters thereof such as, for example, succinic acid, glutaric acid, adipic acid, suberic acid, sebacic acid, dodecane dicarboxylic acid, maleic acid, fumaric acid, phthalic acid, isophthalic acid, terephthalic acid, and hexahydrophthalic acid, or mixtures of the aforementioned acids, as well as polyester polyols from lactones such as for example from ε-caprolactone; and polycarbonate polyols such as those that can be obtained for example by reacting the above-mentioned alcohols—used to build up the polyester polyols—with dialkyl carbonates, diaryl carbonates or phosgene.

Advantageously, the $X_1H$-group-bearing compounds of formula (IV) are di- or higher functional polyols with OH equivalent weights of 600 to 6000 g/OH equivalent, preferably 700 to 2200 g/OH equivalent. Furthermore, advantageously, the polyols are selected from the group consisting of polyethylene glycol, polypropylene glycols, polyethylene glycol polypropylene glycol block polymers, polybutylene glycols, hydroxyl-terminated polybutadiene, hydroxyl-terminated polybutadiene-co-acrylonitrile, hydroxyl-terminated synthetic rubbers and mixtures of the polyols mentioned.

Furthermore, also di- or higher functional amine-terminated polyethylene ethers, polypropylene ethers, polybutylene ethers, polybutadienes, polybutadiene-acrylonitrile as well as other amine-terminated synthetic rubbers or mixtures of the components mentioned may be used as compounds of formula (IV). Particularly preferred are e.g. polyether amines with two, three or four terminal amine groups (e.g., Jeffamine®).

Particularly preferred compounds of formula (IV) are α,ω-polyalkylene glycols with $C_2$-$C_6$ alkylene groups or with mixed $C_2$-$C_6$ alkylene groups, terminated with amino, thiol or hydroxyl groups, preferably hydroxyl groups. Polyetherpolyols such as hydroxyl-terminated polyoxybutylene and polypropylene glycols, hydroxyl group-terminated polybutadiene and amine-terminated polyether are particularly preferred.

In a preferred embodiment, a mixture of at least two, preferably two or three compounds of formula (IV) with $X_1H$=OH is used as compound of formula (IV), namely at least one polyether polyol in combination with at least one OH-terminated rubber, wherein the weight ratio of polyether polyol to OH-terminated rubber preferably is in the range of 7:3 to 2:8. Thus, the mechanical properties can be improved. Polyether polyols and OH-terminated rubbers were already mentioned above. Below, polyether polyols and OH-terminated rubbers are mentioned, which are particularly suitable for the above combination, but also, where appropriate, may be used alone.

One or more polyether polyols can be used. Particularly preferred polyether polyols are polymerization products of ethylene oxide, 1,2-propylene oxide, 1,2- or 2,3-butylene oxide, tetrahydrofuran or mixtures thereof, polypropylene oxides and polytetrahydrofurans are particularly preferred. Such polyether polyols are commercially available. Commercially available polytetrahydrofurans are, e.g., the PolyTHF® products from BASF such as PolyTHF®2000, PolyTHF®2500 CO or PolyTHF®3000 CO. Commercially available polypropylene oxides are, e.g., Caradol® products from Shell such as Caradol®2000 or Caradol®ED56, or Acclaim® products from Bayer such as Acclaim® polyol 2200, Acclaim® polyol 12200 or Acclaim® polyol 4200. Similar possible polyether polyols are Voranol®1010L, Voranol® EP1900 or Voranol®CP4755 from Dow.

The average molecular weight of the polyether polyols used can vary. The polyether polyols have, e.g., a weight average molecular weight (Mw) in the range of 500 to 5000 g/mol, more preferably 1000 to 3000 g/mol and particularly preferably in the range from 1500 to 2500 g/mol, in particular about 2000 g/mol.

Unless otherwise indicated, in the present application the weight average molecular weight is determined by GPC method. This is a type of liquid chromatography wherein different-sized molecules are separated due to their different diffusion volumes. For this purpose, different columns are used depending on the polymer to be analyzed: columns: SDV 100, 1000, $10^4$ Å (0.8×30 cm, 5 μm); eluent: THF; flow: 1 ml/min; temperature: 35° C.; calibration relative to poly(1,4-butadiene) standards: 831-1,060,000 g/mol; sample preparation: about 100 mg sample were dissolved in 10 ml of THF and filtered through a 0.45 μm PTFE membrane filter.

The OH functionality of the polyether polyols used is preferably in the range of about 2, e.g., in the range of 1.9 to 2.1. Optionally, a compound having an OH-functionality of 3, such as, e.g., butoxylated trimethylolpropane (e.g., Simulsol®TOMB) may be mixed with the polyether polyol in order to increase the OH functionality.

The OH functionality may be measured, e.g., by titration. The hydroxyl group-containing compound is reacted with an excess of diisocyanate and after the reaction the excess of isocyanate is determined by titrimetry using 0.1 M HCl solution, and the hydroxyl number is calculated.

One or more OH-terminated rubbers can be used with the use of two OH-terminated rubbers, in particular two OH-terminated polybutadienes, leading to particularly favorable properties. Herein, OH-terminated rubbers are understood to be, for example, and preferably hydroxyl-terminated polybutadienes, and castor oil-based polyols, wherein hydroxyl-terminated polybutadienes being particularly preferred. Castor oil is a triglyceride the OH functionality of which is based on the hydroxyl group of ricinoleic acid, and therefore constitutes a polyol. Castor oil is a natural product that is available in different grades, e.g., standard grade, as dehydrated product or with very low acid number. Derivatized castor oil products are also available, e.g. oxidatively polymerized castor oil or partially dehydrated castor oil, which, e.g., a lower OH functionality can be set. Castor oil-based polyols include castor oil in various grades and castor oil derivatives.

Commercially available hydroxyl-terminated polybutadienes are, e.g., the poly Bd® and Krasol® products from Cray Valley such as Krasol® LBH-P 2000 or poly Bd® R45V. Castor oil-based polyols are, e.g., the ALBODUR® products from Alberdingk Boley such as Albodur®901, or the Polycine® products from Baker Castor Oil Company such as Polycine® GR80.

The hydroxyl-terminated rubbers used preferably have a weight average molecular weight (Mw) of less than 15,000 g/mol, and preferably less than 4,000 g/mol.

The OH functionality of the hydroxyl-terminated rubbers is preferably in the range from 1.7 to 2.2 for anionically produced types or from 2.2 to 2.8 for radically produced types. If the epoxy group-terminated impact-resistance modifier is used in a two-component epoxy adhesive, preferably a hydroxyl-terminated rubber, in particular a hydroxyl-terminated butadiene, with an OH functionality of less then or equal to 2 is used. If the epoxy group-terminated impact-resistance modifier is used in a one-component epoxy adhesive, preferably a hydroxyl-terminated rubber, in particular a hydroxyl-terminated butadiene, with an OH functionality in the range from 2.4 to 2.8 is used. Said preferred OH functionality for two-component and one-component epoxy resin can also be achieved in a mixture of two hydroxyl terminated rubbers, in particular hydroxyl-terminated butadienes.

The weight ratio of polyether polyol to hydroxyl-terminated rubber is preferably in the range from 7:3 to 2:8, more preferably 7:3 to 4:6, and particularly preferably 7:3 to 5:5. In this way, the mechanical properties of the cured adhesive can be improved, especially impact wedge-peel at −30° C.

The isocyanate-terminated prepolymer can be obtained from the reaction of the $X_1H$-bearing compound with a polyisocyanate. Suitable polyisocyanates of formula (V) are diisocyanates or triisocyanates. Suitable diisocyanates are aliphatic, cycloaliphatic, aromatic or araliphatic diisocyanates, in particular commercial products such as methylene diphenyl diisocyanate (MDI), hexamethylene diisocyanate (HDI), toluene diisocyanate (TDI), toluidine diisocyanate (TODI), isophorone diisocyanate (IPDI), trimethylhexamethylene diisocyanate (TMDI), 2,5- or 2,6-bis-(isocyanatomethyl)-bicyclo[2.2.1]heptane, 1,5-naphthalene diisocyanate (NDI), dicyclohexyl methyl diisocyanate ($H_{12}$MDI), p-phenylene diisocyanate (PPDI), m-tetramethyl xylylene diisocyanate (TMXDI), etc., and the dimers thereof. Preferred are HDI, IPDI, MDI or TDI, with MDI being particularly preferred.

Suitable triisocyanates are trimers or biurets of aliphatic, cycloaliphatic, aromatic or araliphatic diisocyanates, in particular the isocyanurates and biurets of the diisocyanates described in the previous paragraph.

Another possibility for $Y_1$ in formula (I) or (IV) are chain-extended radicals of molecules after removal of the $X_1H$ groups, which can be obtained formally by a reaction similar to the reaction between the aforementioned di- or triols and/or di- or triamines as well as the aforementioned di- or tri-isocyanates. This is achieved by varying the stoichiometry of the reactants for which there are two possibilities.

On one hand, OH-functional polymers of various chain lengths can be obtained by an excess of $X_1H$ groups based on the NCO group. Such chain-extended polyols or polyamines of formula (IV) contain urethane or urea groups in the chain and can be reacted further with other di- or triisocyanates, so that polymers of formula (II) are formed. On the other hand, NCO-functional polymers of various chain lengths can be obtained when using less than stoichiometric amounts of $X_1H$ groups based on the NCO groups.

The chain length and degree of crosslinking of these chain-extended polymers of formula (II) or (IV) is strongly dependent on the molar ratio $[X_1H]/[NCO]$. The chains are the longer the closer this ratio is 1. The person skilled in the art understands that chains that are too long or a degree of crosslinking that is too high would lead to polymers that no longer are usable. Diols or diamines and diisocyanates are particularly preferred for the chain extension.

The isocyanate-terminated compound of formula (II) can be obtained preferably by reacting a $X_1H$-bearing prepolymer selected from polyether polyols, polybutadiene polyols, polyester polyols, polycarbonate polyols, NH-terminated polyethers and mixtures thereof with one or more polyisocyanates, in particular di- and/or triisocyanates. Preferably, the isocyanate termination of the OH, SH or NH-terminated polymers, particularly of the aforementioned ones, such as, e.g., polypropylene glycols, Jeffamines, hydroxyl-terminated polybutadienes, etc., is performed with aromatic or aliphatic di- or triisocyanates, such as, e.g., IPDI, HDI, MDI, TDI, etc.

In an alternative embodiment, for producing the isocyanate-terminated compound of formula (II) additionally a polyphenol may be admixed for the reaction in addition to the $X_1H$-group-bearing prepolymer and the polyisocyanate as described above. The polyphenols are e.g. bis-, tris- and/or tetraphenols, where the polyphenols may be unsubstituted or substituted. In this case, isocyanate-terminated compounds of formula (II) are obtained which contain at least one aromatic structural element, which is incorporated into the polymer chain via urethane groups. Such compounds are described in WO 2005/007720 in detail, which is hereby incorporated by reference, in particular with regard to the details of the preparation and the applicable components. Suitable polyphenols and suitable routes of preparation are described on pages 9 and 10, and 13 and 14, respectively, of said document.

For producing liquid rubber containing an epoxy group-terminated impact-resistance modifier one or more isocyanate-terminated prepolymers are reacted with an epoxy resin containing an epoxy compound having one primary or secondary hydroxyl group. The hydroxy epoxy compound of formula (III) has 1, 2 or 3 epoxy groups. The hydroxyl group of this hydroxy epoxy compound (III) can be a primary or a secondary hydroxyl group. The hydroxy epoxy compound of formula (III) is preferably a monohydroxy epoxy compound.

The epoxy resin for reaction with the isocyanate-terminated prepolymer may be an epoxy resin or a mixture of two or more epoxy resins. In particular, the epoxy resin is a liquid epoxy resin. The epoxy resin contains or consists of hydroxyl-containing species, in particular the hydroxy epoxy compound of formula (III). The epoxy resin or liquid epoxy resin may be a commercially available epoxy resin product.

Epoxy resins are obtained, e.g., by the reaction of an epoxy compound such as, e.g., epichlorohydrin, with a multi-functional alcohol, i.e., a diol, triol or polyol. When reacting multi-functional alcohols with an epoxy compound such as, e.g., epichlorohydrin, depending on the reaction conditions, the corresponding hydroxy epoxy compounds also form as byproducts in various concentrations. They can be isolated by conventional separation operations. According to the invention, however, the product mixture obtained in the glycidylation reaction of polyols, made up of polyol that had reacted completely or partially with formation of glycidyl ether, can be used. Examples of these hydroxyl-containing epoxides in epoxy resins are trimethylol propane diglycidyl ether contained as a mixture in trimethylol propane triglycidyl ether, glycerol diglycidyl ether contained as a mixture in glycerol triglycidyl ether, pentaerythritol triglycidyl ether contained as a mixture in pentaerythritol tetraglycidyl ether. In a preferred embodiment, the hydroxyl-containing epoxy is trimethylol propane diglycidyl ether which is present in a relatively high proportion in conventionally synthesized trimethylol propane triglycidyl ether.

However, other similar hydroxyl-containing epoxides, in particular glycidol, 3-glycidyloxybenzyl alcohol or hydroxymethyl cyclohexene oxide can be used. Epoxy resins comprising trimethylol propane diglycidyl ether, butanediol diglycidyl ether, cyclohexanedimethanol diglycidyl ether or mixtures thereof are preferred.

Other liquid epoxy resins of formula (VII) may be used, which are described below for the epoxy resins (A) which contain an epoxy compound of the formula (III) containing a primary or secondary hydroxyl group.

Particularly preferred are epoxy resins based on diglycidyl ethers of bisphenol A (BADGE), bisphenol F or bisphenol N/F. These epoxy resins are widely available commercially. They can be obtained from the reaction of bisphenol A, bisphenol F or mixtures of bisphenol A and bisphenol F (also referred to as bisphenol A/F) with epichlorohydrin. Depending on the reaction conditions, low molecular weight or high molecular weight reaction products can be prepared.

The β-hydroxy ether of formula (VI) as the hydroxy epoxy compound of formula (III) is particularly preferred value of less than 1, in particular less than 0.3, and preferably less than 0.2. The term "independently of one another" in the definition of groups and radicals in this document means in each case that several groups that are present but are designated identically in the formulas, in each case can have a different meaning.

Such liquid epoxy resins of formula (A-I) are commercially available products, e.g., Araldite® GY 250, Araldite® PY 304, Araldite® GY 282 (Huntsman, or Hexion) or D.E.R.® 331, D.E.R.® 330 or D.E.R.® 332 (Dow) or Epikote® 828 (Hexion).

In another preferred embodiment, epoxy resins arising from the reaction of monophenols and epoxy resins, such as those, for example, obtained by reaction of p-methoxyphenol and D.E.R. 332 can be used. Furthermore, very different epoxides with a hydroxy ether group, prepared by the reaction of (poly)epoxides with less than a stoichiometric amount of monovalent nucleophiles such as carboxylic acids, phenols, thiols or sec-amines can be used. In a further embodiment, distillation residues which are obtained in the production of high-purity distilled epoxy resins can be used.

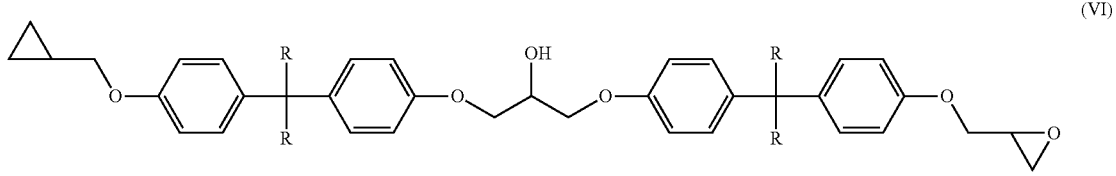

(VI)

wherein R independently of one another is H or methyl, which is contained in about 15% in commercially available liquid epoxy resins which are produced from bisphenol A (R=CH$_3$) and epichlorohydrin, as well as the corresponding p-hydroxy ethers which are formed in the reaction of bisphenol-F (R=H) or the mixture of bisphenol A and bisphenol F with epichlorohydrin. In addition to the dimer of bisphenol A diglycidyl ether and the corresponding dimer with bisphenol F or mixtures of bisphenol A and bisphenol F according to formula (VI), also extended products of the BADGE bisphenol A addition or corresponding products with bisphenol F can be used which, e.g., contain 3 or 4 bisphenol units. Such an extension is obtained in particular when a diglycidyl ether, in particular a diglycidyl ether of bisphenol A (BADGE) and bisphenol F, is reacted with a bisphenol at elevated temperature. It is advantageous to use such a bisphenol-extended diglycidyl ether with non-extended diglycidyl ether.

Accordingly, liquid epoxy resins of formula (A-I) are preferably used as epoxy resins Such distillation residues such as Epilox® M850 contain significantly higher concentrations of hydroxyl-containing epoxy compounds than standard epoxy resins.

The free primary or secondary OH functionality of the hydroxy epoxy compound of formula (III) enables efficient reaction with terminal isocyanate groups of prepolymers, without having to use disproportionate excesses of the epoxy component.

For the reaction of the isocyanate-terminated prepolymers of formula (II) corresponding amounts of epoxy resin containing hydroxyl-containing epoxies of formula (III), preferably monohydroxy epoxies may be used. An equimolar stoichiometry with respect to the isocyanate groups and the hydroxyl groups may be used, i.e., a molar ratio [OH]/[NCO] of 1, however, different ratios may be used as well. Suitably, the ratio [OH]/[NCO] is, e.g., 0.6 to 3.0, preferably 0.7 to 1.5, and in particular 0.8 to 1.2.

The liquid rubber obtained containing the epoxy group-terminated polymer advantageously has an elastic character and is also advantageously soluble or dispersible in epoxy

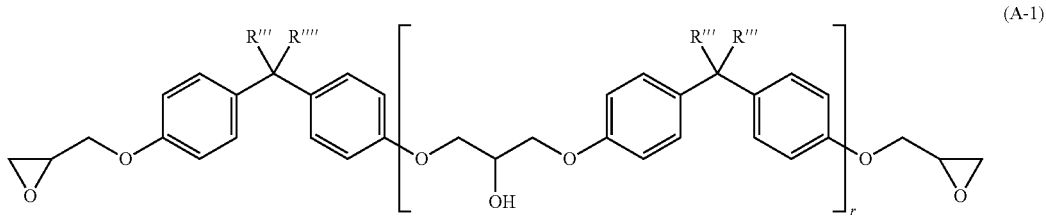

(A-1)

wherein substituents R''' and R'''' independently of one another represent H or CH$_3$ and the index r has a value from 0.01 to 1, preferably 0.05 to 1. Preferably, r represents a resins. The liquid rubber may be diluted with other epoxy resins if required and depending on the resulting viscosity. Preferred for this purpose are diglycidyl ethers of bisphenol A, bisphenol F, and of bisphenol A/F, and epoxy group-bearing reactive diluents, described below, in particular hexanediol diglycidyl ether, polypropylene glycol diglycidyl ether and trimethylol propane triglycidyl ether.

According to the invention, in the synthesis of the epoxy resin-terminated polyurethane polymers at least one compound selected from anhydrides, ketones and aldehydes is used as glycol scavenger. When using an anhydride, the scavenging reaction of glycols contained in the epoxy resin is based on the thermodynamically particularly favored formation of cyclic ester functionalities between acid anhydrides and glycols. In analogy to this scavenging reaction, the glycols contained in the epoxy resins can alternatively be bound by reaction with ketones and aldehydes as acetals and ketals, respectively. Producing the epoxy group-terminated liquid rubbers without glycol scavenger leads to a significant gelling and inhomogeneities of the polymers.

The reaction of the isocyanate-terminated prepolymer with the epoxy resin that contains the hydroxy epoxy compound is carried out in the presence of the glycol scavenger. For this purpose, the isocyanate-terminated prepolymer, the epoxy resin and the glycol scavenger may be mixed before the reaction to form the reaction mixture, wherein the order of addition is selected freely. For example, first the isocyanate-terminated prepolymer may be added to the hydroxy epoxy compound and then the glycol scavenger may be added, after which mixing is carried out by stirring.

In an alternative embodiment, the presence of the glycol scavenger can be achieved in that the epoxy resin containing the hydroxy epoxy compound of formula (III) is first reacted with the glycol scavenger, and then the resulting reaction product is mixed and reacted with the isocyanate-terminated prepolymer of formula (II).

Preferably, an anhydride is used as glycol scavenger. Said anhydride is an organic anhydride, i.e., a carboxylic acid anhydride. One anhydride or a mixture of different anhydrides can be used. In principle, a wide range of anhydrides are suitable as scavenger of glycol-containing species in epoxy resins or mixtures of epoxy resins. Thus, aromatic, cycloaliphatic, aliphatic or difunctional anhydrides can be used.

Mixed anhydrides can be used as well, however, usually anhydrides derived from a carboxylic acid are preferred. Particularly preferred are cyclic anhydrides and derivatives thereof. Such cyclic anhydrides are usually derived from dicarboxylic acids. Derivatives are understood to mean substituted anhydrides, e.g., substituted with $C_1$-$C_{18}$ alkyl groups, $C_1$-$C_{18}$ alkenyl groups, aryl groups, fused alicyclic or aromatic rings, and/or anhydrides, in which aromatic groups are partially or fully hydrogenated. Examples of suitable anhydrides are alkanoic acid anhydrides, such as $C_2$-$C_{18}$ alkanoic anhydrides, and derivatives thereof, e.g., acetic anhydride, propionic anhydride, butyric anhydride, valeric anhydride and stearic anhydride, dialkanoic anhydrides, such as $C_4$-$C_8$ dialkanoic anhydrides, and derivatives thereof, e.g., succinic anhydride, methyl-succinic anhydride, (2-dodecene-1-yl) succinic anhydride, phenyl succinic anhydride, glutaric anhydride, methyl-glutaric anhydride, 3,3-dimethyl-glutaric anhydride and itaconic anhydride, dialkenoic anhydrides, such as $C_4$-$C_8$-dialkenoic anhydrides, and derivatives thereof, e.g., maleic anhydride, 2,3-dimethylmaleic anhydride, citraconic anhydride, alicyclic dicarboxylic anhydrides and derivatives thereof, such as cyclohexane dicarboxylic anhydride, norbornene-2,3-dicarboxylic anhydride, methyl-norbornene-2,3-dicarboxylic anhydride, camphoric anhydride, aromatic anhydrides and derivatives thereof such as benzoic anhydride, phthalic anhydride and derivatives thereof such as methyl-phthalic anhydride (MPA), methyl-tetrahydrophthalic anhydride (MTHPA), tetra-hydrophtalic anhydride, tetra-phenyl-phthalic anhydride, methyl-hexahydrophthalic anhydride (MHHPA) and hexahydrophthalic anhydride, homophthalic anhydride, 1,2-naphthalic anhydride and derivatives thereof such as 3,4-dihydro-1,2-naphthalic anhydride, difunctional anhydrides such as pyromellitic dianhydrid, benzophenone tetracarboxylic dianhydride and biphenyl-tetracarboxylic acid dianhydride and diglycolic anhydride. Preferred anhydrides are succinic anhydride, phthalic anhydride and derivatives thereof, in particular methyl-phthalic anhydride or 4-methyl-phthalic anhydride. Preferably, the anhydride comprises the succinic anhydride ring or maleic anhydride ring as structural element.

Examples of ketones and aldehydes, which can be used as glycol scavenger according to the invention, are formaldehyde, acetone, cyclopentanone or benzaldehyde, which can bind glycols with formation of cyclic 1,3-dioxolanes.

The amount of glycol scavenger in the reaction mixture comprising the isocyanate-terminated prepolymer of formula (II) and the epoxy resin may vary within wide ranges and depends on the nature of the specific reactants used, the ratio thereof and the type of glycol scavenger. For example, at least 0.1% by weight, more preferably at least 0.25% by weight and particularly preferably at least 0.4% by weight, and not more than 5.0% by weight, preferably not more than 3.0% by weight and more preferably not more than 2.50 or 2.75% by weight glycol scavenger, preferably anhydride, based on the amount of epoxy resin used, is used. Particularly preferred is the use of 0.25 to 3.00% by weight, more preferably 0.50 to 1.50% by weight glycol scavenger, preferably anhydride, based on the amount of epoxy resin used. If the amount is too small the gelling is not or not sufficiently prevented. If an excessive amount of glycol scavenger is used, a film forms after a certain time due to conversion, i.e., the isocyanate content is too high, by crosslinking reaction of the isocyanate with humidity.

By combining the production process of the reaction of isocyanate-terminated prepolymers with OH-functional epoxides from the epoxy resin with the glycol scavenger an undesired crosslinking which leads to gelling is prevented or minimized. As a result of gelling the prepolymers in an adhesive cannot be used because the processing is no longer guaranteed.

As explained above, the stoichiometry of the isocyanate-terminated prepolymers and the OH-functional epoxides in the epoxy resin can be controlled in the reaction in such a way that completely blocked polymers are obtained. Also according to the invention are partially blocked polymers in which a portion of the isocyanate groups remain unreacted for reactions in a later reaction step. The following compound of formula (I) represents completely blocked polymers, which can be obtained in the reaction according to the invention, wherein the substituents and indices are as defined in the formulas (II) and (III). The only partially blocked polymers correspond to the compound of formula (I), however, not all the isocyanate groups are blocked by the hydroxy epoxy compound.

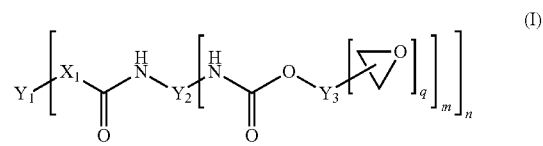

According to the method according to the invention liquid rubbers comprising blocked or partially blocked isocyanate-terminated prepolymers can be obtained which can be used as epoxy group-terminated impact-resistance modifier in a one-component or two-component epoxy resin composition to increase the impact resistance of the cured epoxy resin matrix. It is preferably a two-component epoxy resin. The two-component or one-component epoxy resin composition can be liquid, pasty or solid and/or cold- or heat-curing.

The epoxy resin composition is preferably a one-component or two-component epoxy resin adhesive, in particular a structural and crash-resistant adhesive, e.g., for OEM products, EP/PU hybrids, structural foams made from epoxy resin systems (such as Sika Reinforcer®) or repair applications.

The one-component or two-component epoxy resin composition according to the invention comprises at least the liquid rubber according to the invention. The epoxy compositions according to the invention further comprise at least one curing agent for epoxy resins, which, in a one-component composition, is present in the same component as the liquid rubber or, in a two-component composition, in the second component.

Depending on the epoxy resin, which was used for producing the liquid rubber, no further epoxy resin needs to be added in addition to the liquid rubber according to the invention in the one-component or two-component epoxy resin composition. Optionally, and preferably, however, an additional epoxy resin (A) may be included. The additional epoxy resin (A) may be a liquid epoxy resin or solid epoxy resin. Suitable epoxy resins (A) are all epoxy resins, which have already been described above as epoxy resins for the reaction with the isocyanate-terminated prepolymer. More suitable components and their proportions are described for the epoxy resin composition that apply equally to the preferred epoxy resin adhesive.

Liquid epoxy resin or solid epoxy resin (A) includes in particular the diglycidyl ethers of formula (VII)

(VII)

wherein $R^4$ represents a divalent aliphatic or mononuclear aromatic or a dinuclear aromatic radical.

Diglycidyl ethers of formula (VII) include in particular
diglycidyl ethers of difunctional saturated or unsaturated, branched or unbranched, cyclic or open-chain $C_2$-$C_{30}$ alcohols such as ethylene glycol, butanediol, hexanediol, octanediol glycidyl ether, cyclohexane dimethanol diglycidyl ether, neopentyl glycol diglycidyl ether;

diglycidyl ethers of difunctional, low to high molecular weight polyether polyols such as, for example, polyethylene glycol diglycidyl ether, polypropylene glycol diglycidyl ether;

diglycidyl ethers of difunctional diphenols and optionally triphenols, wherein not only pure phenols are included but optionally also substituted phenols. The type of substitution can be very diverse. In particular, this includes substitution directly on the aromatic ring to which the phenolic OH group is attached. Moreover, the phenols are not only mononuclear aromatics but also polynuclear or fused aromatics or heteroaromatics having the phenolic OH group directly on the aromatic or heteroaromatic moiety. Suitable bisphenols and optionally triphenols are, for example, 1,4-dihydroxybenzene, 1,3-dihydroxybenzene, 1,2-dihydroxybenzene, 1,3-dihydroxytoluene, 3,5-dihydroxybenzoate, 2,2-bis-(4-hydroxyphenyl) propane (=bisphenol A), bis-(4-hydroxyphenyl) methane (=Bisphenol F), bis-(4-hydroxyphenyl) sulfone (=bisphenol S), naphthoresorcinol, dihydroxynaphthalene, dihydroxyanthraquinone, dihydroxybiphenyl, 3,3-bis-(p-hydroxyphenyl) phthalides, 5,5-bis-(4-hydroxyphenyl) hexahydro-4,7-methanoindane, phenolphthalein, fluorescein, 4,4'-[bis-(hydroxyphenyl)-1,3-phenylene-bis-(1-methylethylidene)] (=bisphenol M), 4,4'-[bis-(hydroxyphenyl)-1,4-phenylene-bis-(1-methylethylidene)] (=bisphenol P), 2,2'-diallyl bisphenol A, diphenols and dicresols, produced by reaction of phenols or cresols with diisopropylidene benzene, phloroglucinol, gallic acid esters, phenol or cresol novolaks with OH functionality of 2.0 to 3.5, and all isomers of the aforementioned compounds.

Particularly preferred as diglycidyl ether of formula (VII) are liquid epoxy resins of formula (A-I) and solid epoxy resins of formula (A-II).

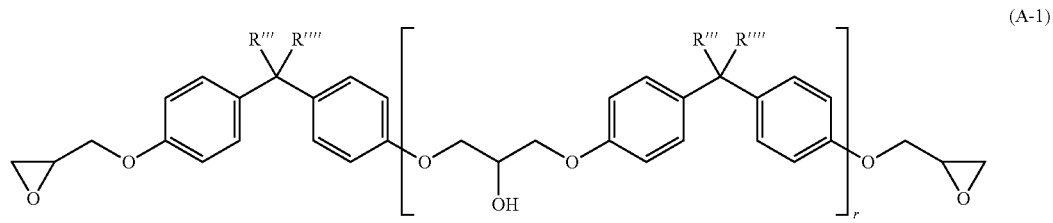

(A-I)

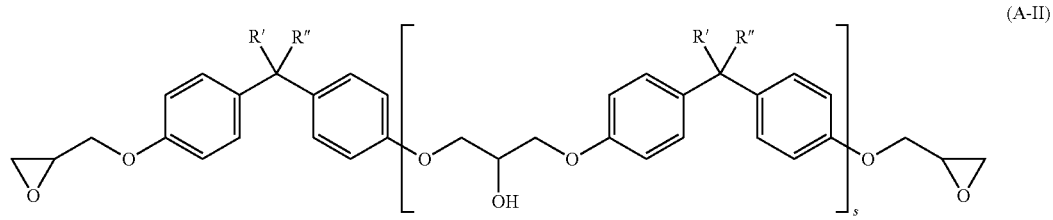

(A-II)

Here, the substituents R', R", R''' and R'''' represent independently of one another either H or CH$_3$. Furthermore, the index r represents a value from 0 to 1. Preferably, r represents for a value of less than 0.2. Furthermore, the index s represents a value of >1, in particular >1.5, in particular 2 to 12.

Compounds of formula (A-II) with an index s of between 1 and 1.5 are referred to as semisolid epoxy resins by the person skilled in the art. For the present invention, they are also considered to be solid resins. However, preferred are solid epoxy resins in the narrower sense, i.e., where the index s has a value of >1.5.

Such solid epoxy resins are commercially available, for example from Dow or Huntsman or Hexion. Commercially available liquid epoxy resins of the formula (A-I) have been mentioned above.

Preferably, the diglycidyl ether of formula (VII) is a liquid epoxy resin, in particular a diglycidyl ether of bisphenol A (BADGE), of bisphenol F, and of bisphenol A/F.

In one embodiment curing agents for epoxy resin compositions include in particular polyamines, polymercaptans, polyamidoamines, amino-functional polyamine/polyepoxy adducts, as they are well known to those skilled in the art as a hardener. In this embodiment, the composition is a two-component epoxy resin composition consisting of two components, i.e., a first component (K1) and a second component (K2). The first component (K1) comprises at least the liquid rubber according to the invention, and optionally an additional liquid epoxy resin and/or solid epoxy resin (A). The second component (K2) comprises at least one curing agent for epoxy resins. The first component (K1) and the second component (K2) are each stored in an individual container. Only at the time of use, the two components are mixed together, and the reactive components react with each other and thus lead to crosslinking of the composition. Such two-component epoxy resin compositions can be cured already at low temperatures, typically between 0° C. to 100° C., in particular at room temperature. In this embodiment curing occurs by an addition reaction between hardener and the compounds having epoxy groups present in the composition. Thus, it is particularly advantageous in this embodiment, when the amount of the curing agent in the entire composition is such that the epoxy-reactive groups are in a stoichiometric ratio with the epoxy groups.

In an alternative embodiment, in particular for the one-component composition, the curing agent for epoxy resins is one which is activated by elevated temperature. In this embodiment, the composition is a heat-curing epoxy resin composition. "Elevated temperature" in this document generally refers to a temperature above 100° C., in particular between 110° C. and 200° C. The curing agent for epoxy resins which is activated by elevated temperature is preferably a curing agent which is selected from the group consisting of dicyandiamide, guanamine, guanidine, aminoguanidine, and derivatives thereof. Also possible are curing agents with an accelerating effect such as substituted ureas, such as, for example, 3-chloro-4-methylphenyl urea (Chlortoluron), or phenyldimethyl ureas, in particular p-chlorophenyl-N,N-dimethylurea (Monuron), 3-phenyl-1,1-dimethyl urea (Fenuron) or 3,4-dichlorophenyl-N,N-dimethyl urea (Diuron), but also aliphatically substituted ureas. Furthermore, compounds of the imidazole class can be used such as 2-isopropylimidazole and 2-hydroxy-N-(2-(2-(2-hydroxyphenyl)-4,5-dihydroimidazol-1-yl)-ethyl)benzamide and amine complexes.

Preferably, the heat-activatable curing agent is a curing agent which is selected from the group consisting of dicyandiamide, guanamine, guanidine, aminoguanidine, and derivatives thereof; substituted ureas, in particular 3-chloro-4-methylphenyl urea (Chlorotoluron), or phenyldimethyl ureas, in particular p-chlorophenyl-N,N-dimethyl urea (Monuron), 3-phenyl-1,1-dimethyl urea (Fenuron), 3,4-dichlorophenyl-N,N-dimethyl urea (Diuron) or aliphatically substituted ureas, and imidazoles and amine complexes. Dicyandiamide is a particularly preferred curing agent.

Advantageously, the total proportion of the curing agent for epoxy resins which is activated by elevated temperature is 0.5 to 12% by weight, preferably 1 to 8% by weight, based on the weight of the total composition.

It is preferred that the composition further comprises at least one additional optional impact-resistance modifier (SM), which is different from the already described epoxy-terminated impact-resistance modifier in the liquid rubber according to the invention. The additional impact-resistance modifiers (SM) can be solid or liquid.

In one embodiment, this additional impact-resistance modifier (SM) is a liquid rubber (SM1), which is a carboxyl- or epoxy-terminated acrylonitrile/butadiene copolymer or a derivative thereof. Such liquid rubbers are commercially available, for example, under the name Hypro® (formerly Hycar®) CTBN and CTBNX and ETBN from Emerald Performance Materials LLC. Suitable derivatives include in particular elastomer-modified prepolymers having epoxy group such as those commercialized under the product line Polydis®, preferably from the product line Polydis® 36, from Struktol® (Schill+Seilacher Group, Germany) or under the product line Albipox® (Evonik Hanse GmbH, Germany). In another embodiment the impact-resistance modifier (SM) is a liquid polyacrylate rubber (SM1), which is completely miscible with liquid epoxy resins, and only separates upon curing of the epoxy resin matrix forming microdroplets. Such liquid polyacrylate rubbers are for example available under the designation 20208-XPA from Rohm and Haas.

The person skilled in the art understands that, of course, mixtures of liquid rubbers can be used also, in particular mixtures of carboxyl or epoxy-terminated acrylonitrile/butadiene copolymers or derivatives thereof with epoxy-terminated polyurethane prepolymers.

In another embodiment, the additional impact-resistance modifier (SM) can be a solid impact-resistance modifier, which is an organic ion-exchanged layered minerals. The ion-exchanged layered minerals may be either a cation-exchanged or an anion-exchanged layered minerals. It is also possible that the composition contains both a cation-exchanged layered minerals and an anion-exchanged layered minerals.

Here, the cation-exchanged layered minerals is obtained from a layered minerals, wherein at least part of the cations have been replaced by organic cations. Examples of such cation-exchanged layered minerals are in particular those which are mentioned in U.S. Pat. No. 5,707,439 or U.S. Pat. No. 6,197,849. Also described there is the method for producing these cation-exchanged layered minerals. Preferably, the layered minerals is a layer silicate. Particularly preferably, the layered minerals is a phyllosilicate, such as those described in U.S. Pat. No. 6,197,849, column 2, line 38 to column 3, line 5, in particular a bentonite. Kaolinite or a montmorillonite or a hectorite or an illite have proven to be particularly suitable layered minerals.

At least part of the cations of the layered minerals are replaced by organic cations. Examples of such cations include n-octylammonium, trimethyldodecylammonium, dimethyldodecylammonium, or bis-(hydroxyethyl)-octadecylammonium or similar derivatives of amines which can be obtained from natural fats and oils; or guanidinium cations or amidinium cations; or cations of the N-substituted derivatives of pyrrolidine, piperidine, piperazine, morpholine, thiomorpholine; or cations of 1,4-diazabicyclo[2.2.2]octane (DABCO) and 1-azobicyclo[2.2.2]octane; or cations of N-substituted derivatives of pyridine, pyrrole, imidazole, oxazole, pyrimidine, quinoline, isoquinoline, pyrazine, indole, benzimidazol, benzoxazole, thiazole, phenazine, and 2,2'-bipyridine. Also suitable are cyclic amidinium cations, in particular those disclosed in U.S. Pat. No. 6,197,849 in column 3, line 6 to column 4, line 67.

Preferred cation-exchanged layered minerals are known to the skilled person under the name Organoclay or Nanoclay and are commercially available, for example, under the group names Tixogel® or Nanofil® (Sudchemie), Cloisite® (Southern Clay Products) or Nanomer® (Nanocor Inc.) or Garmite® (Rockwood).

The anion-exchanged layered mineral is obtained from a layered mineral in which at least part of the anions have been replaced by organic anions. An example of an anion-exchanged layered mineral is a hydrotalcite, wherein at least part of the carbonate anions of the intermediate layers have been replaced by organic anions.

In a further embodiment, the additional impact-resistance modifier (SM) is a solid impact-resistance modifier which is a block copolymer (SM2). The block copolymer (SM2) is obtained from an anionic or controlled radical polymerization of methacrylic acid ester with at least one more monomer having an olefinic double bond. Preferred monomers having an olefinic double include in particular those in which the double bond is conjugated directly to a hetero atom or at least one further double bond. In particular, suitable monomers are selected from the group comprising styrene, butadiene, acrylonitrile and vinyl acetate. Preferred are acrylate-styrene-acrylic acid (ASA) copolymers, which are available under the name GELOY® 1020 from GE Plastics, for example. Particularly preferred block copolymers (SM2) are block copolymers made of methyl methacrylate, styrene and butadiene. Such block copolymers are available, for example, as triblock copolymers under the group name SBM from Arkema.

In a further embodiment, the additional impact-resistance modifier (SM) is a core-shell polymer (SM3). Core-shell polymers consist of an elastic core polymer and a rigid shell polymer. Particularly suitable core-shell polymers consist of a core (core) made of elastic acrylate or butadiene polymer surrounded by a rigid shell (shell) of a rigid thermoplastic polymer. These core-shell structure is formed either spontaneously by separation of a block copolymer or is determined by the polymerization conditions as latex or suspension polymerization with subsequent grafting. Preferred core-shell polymers are so-called MBS polymers, which are commercially available under the trade name Clearstrength® from Arkema, Paraloid® from Dow (formerly Rohm and Haas) or F-351® from Zeon.

Particularly preferred are core-shell polymer particles which are already present as dried polymer latex. Examples are GENIOPERL® M23A from Wacker with polysiloxane core and acrylate shell, radiation-crosslinked rubber particles of the NEP series, produced by Eliokem, or Nanoprene® from Lanxess or Paraloid® EXL from Dow. Other comparable examples of core-shell polymers are offered under the name Albidur® from Evonik Hanse GmbH, Germany. Also suitable are nanoscale silicates in an epoxy matrix, such as those offered under the trade name Nonopox from Evonik Hanse GmbH, Germany.

In another embodiment, the additional impact strength modifier (SM) is a reaction product (SM4) of a carboxylated solid nitrile rubber with excess epoxy resin.

It has been found advantageous that one or more additional impact-resistance modifiers (SM) are present in the composition. It has been found particularly advantageous that such additional impact-resistance modifier (SM) is an impact-resistance modifier having epoxy end groups of formula (VIII).

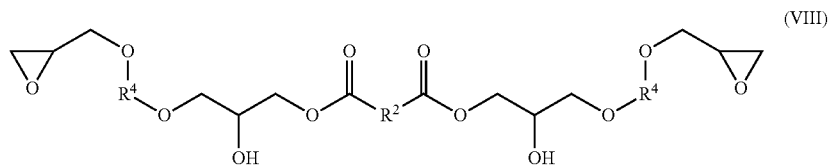

(VIII)

Here, $R^7$ is a divalent radical of a carboxyl group-terminated butadiene/acrylonitrile copolymer (CTBN) after removal of the terminal carboxyl groups. Radical $R^4$ is as defined and as described above for formula (VII). In particular, $R^7$ represents a radical that is obtained by formal removal of the carboxyl groups of a carboxyl group-terminated butadiene/acrylonitrile copolymer CTBN which is commercialized under the name Hypro® CTBN from Noveon. $R^7$ is preferably a divalent radical of formula (VIII').

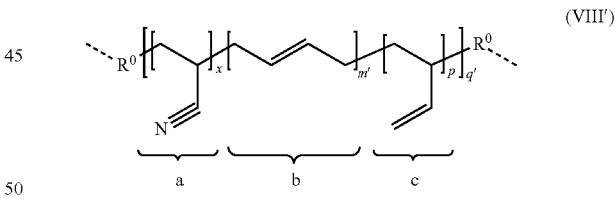

(VIII')

Here, $R^0$ represents a linear or branched alkylene radical having 1 to 6 C atoms, in particular 5 C atoms, which is optionally substituted by unsaturated groups. In an especially mentioned embodiment, radical $R^0$ represents a radical of formula (VIII-a).

(VIII-a)

Furthermore, the index q' represents a value between 40 and 100, in particular between 50 and 90. The designations b and c represent the structural elements originating from butadiene, and a represents the structural element originating from acrylonitrile. The indices x, m' and p' in turn represent values which describe the ratio of structural element a, b and c relative to one another. The index x represents a value from 0.05 to 0.3, the index m' represents values from 0.5-0.8, the index p represents values from 0.1-0.2 with the proviso that the sum of x, m' and p is 1.

The person skilled in the art understands that the structure shown in formula (VIII') is to be understood as a simplified representation. Thus, the building blocks a, b and c can be arranged randomly, alternately or in blocks with one another. In particular, formula (VIII') not necessarily constitutes a triblock copolymer.

The production of the impact-resistance modifier of formula (VIII) is carried out by reacting a carboxyl group-terminated butadiene/acrylonitrile copolymer (CTBN), in particular of formula (IX), wherein the substituents are as defined in formula (VIII), with an above-described diglycidyl ether of formula (VII) in a stoichiometric excess of the diglycidyl ether, i.e. that the ratio of glycidyl groups to COOH groups is greater than or equal 2.

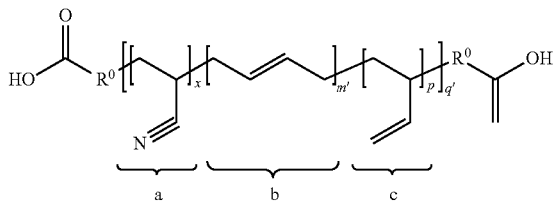

(IX)

The proportion of the one or more additional impact-resistance modifier(s) (SM) described above, which is/are different from the epoxy-terminated impact-resistance modifier in the liquid rubber according to the invention is, for example, 0 to 45% by weight, preferably 1 to 45% by weight, in particular 3 to 35% by weight, based on the weight of the total composition.

The composition may comprise, of course, other components. These are in particular filler (F), reactive diluent (G), such as epoxy group-bearing reactive diluents, catalysts, stabilizers, in particular heat and/or light stabilizers, thixotropic agents, plasticizers, solvents, mineral or organic fillers, blowing agents, dyes and pigments, corrosion protection agents, surfactants, defoamers and adhesion promoters. As these additives, all known in the art can be used in the usual amounts.

The fillers (F) are, e.g., preferably mica, talc, kaolin, wollastonite, feldspar, syenite, chlorite, bentonite, montmorillonite, calcium carbonate (precipitated or ground), dolomite, quartz, silica (pyrogenic or precipitated), cristobalite, calcium oxide, aluminum hydroxide, magnesium oxide, hollow ceramic spheres, hollow glass spheres, hollow organic spheres, glass beads, colored pigments. Fillers (F) include both organic coated and uncoated forms that are commercially available and known to the person skilled in the art.

Advantageously, the overall proportion of the total filler (F) is 3 to 50% by weight, preferably 5 to 35% by weight, in particular 5 to 25% by weight, based on the weight of the total composition The reactive diluents (G) are in particular:

glycidyl ethers of monofunctional saturated or unsaturated, branched or unbranched, cyclic or open-chain $C_4$-$C_{30}$ alcohols, in particular selected from the group consisting of butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether.

glycidyl ethers of difunctional saturated or unsaturated, branched or unbranched, cyclic or open-chain $C_2$-$C_{30}$ alcohols, in particular selected from the group consisting of ethylene glycol, butanediol, hexanediol, octanediol glycidyl ether, cyclohexane dimethanol diglycidyl ether and neopentyl glycol diglycidyl ether, glycidyl ethers of tri- or polyfunctional, saturated or unsaturated, branched or unbranched, cyclic or open-chain alcohols, such as epoxidized castor oil, epoxidized trimethylolpropane, epoxidized pentaerythritol or polyglycidyl ethers of aliphatic polyols such as sorbitol, glycerol or trimethylol propane.

glycidyl ethers of phenol and aniline compounds, in particular selected from the group consisting of phenyl glycidyl ether, cresyl glycidyl ether, p-tert-butyl-phenyl glycidyl ether, nonylphenol glycidyl ether, 3-n-pentadecenyl glycidyl ether (from cashew nut shell oil), N,N-diglycidyl aniline and triglycidyl of p-aminophenol.

epoxidized amines such as N,N-diglycidyl cyclohexylamine.

epoxidized mono- or dicarboxylic acids, in particular selected from the group consisting of glycidyl neodecanoate, glycidyl methacrylate, glycidyl benzoate, diglycidyl phthalate, tetra- and hexahydrophthalate and diglycidyl esters of dimeric fatty acids and diglycidyl esters of terephthalic acid and trimellitic acid.

epoxidized di- or trifunctional, low to high molecular weight polyether polyols, in particular polyethylene glycol diglycidyl ether or polypropylene glycol diglycidyl ether.

Particularly preferred are hexanediol diglycidyl ether, cresyl glycidyl ether, p-tert-butylphenyl glycidyl ether, polypropylene glycol diglycidyl ether and polyethylene glycol diglycidyl ether.

Advantageously, the total proportion of the reactive diluent (G) is 0.1 to 20% by weight, preferably 1 to 8% by weight, based on the weight of the total composition.

Suitable plasticizers are, e.g., phenol alkylsulfonates or benzenesulfon-N-butyl-amide, which are available as Mesamoll® and Dellatol BBS, respectively, from Bayer. Suitable stabilizers are, e.g., optionally substituted phenols such as butylated hydroxytoluene (BHT) or Wingstay® T (Elikem), sterically hindered amines or N-oxyl compounds such as TEMPO (Evonik).

In a particular embodiment, the composition further contains at least one physical or chemical blowing agent, in particular in an amount of 0.1 to 3% by weight, based on the weight of the composition. Preferred blowing agents are chemical blowing agents which when heated, in particular to a temperature of 100 to 200° C., release a gas. It may be exothermic blowing agents, such as, e.g., azo compounds, hydrazine derivatives, semicarbazides or tetrazoles. Azodicarbonamide and oxy-bis-(benzenesulfonylhydrazide) are preferred, which release energy upon decomposition. Also suitable are endothermic blowing agents, such as sodium bicarbonate/citric acid mixtures. Such chemical blowing agents are available, for example, under the name Celogen® from Chemtura. Also suitable are physical blowing agents, which are commercialized under the trade name Expancel® by Akzo Nobel. Expancel® and Celogen® are particularly preferred.

Furthermore, preferred compositions and proportions thereof for one-component and two-component epoxy resin adhesives with the liquid rubber according to the invention containing the epoxy group-terminated impact resistance modifier are listed in exemplary fashion. Percentages relate to the weight.

One-Component Adhesives:

A) 0-60% base epoxy resins (liquid resin, solid resin, epoxidized novolacs, etc.)

B) 20-80%, preferably 30-60% epoxy-terminated PU polymer according to the invention mixed together with liquid resins (BADGE etc.)

C) 0-40%, preferably 10-25% blocked PU polymer

D) 0-30%, preferably 5-20% CTBN-derivative (Hycar adducts, e.g., with BADGE)

E) 0-15%, preferably 2.5-7.5% reactive diluent (e.g., hexanediol diglycidyl ether)

F) 0-25% other unreactive flexibilizers rubber particles (SM2), nanoscale core-shell (SM3) or also HAT-paste (adduct MDI and monobutylamine, cf. EP 1152019).

G) 2-10%, preferably 3-4.5% curing agents and catalysts

H) 10-40%, preferably 15-25% organic or mineral fillers

I) additives and auxiliaries (e.g., flow agents, pigments, adhesion promoters)

Two-Component Adhesives:

Component A:

A) 5-80%, preferably 30-60% of the mixed/partially blocked polymer mixed together with liquid resins (BADGE etc.)

B) 0-50% liquid resin (BADGE etc.)

C) 0-20% solid resin

D) 0 to 10% reactive diluent (e.g., hexanediol diglycidyl ether)

E) 0-25% CTBN derivative (e.g., BADGE)

F) 0-25% other unreactive flexibilizers rubber particles (SM2), nanoscale core-shell (SM3) or also HAT-paste (adduct MDI and monobutylamine, EP 1152019)

G) 0-50% organic or mineral fillers

H) additives and auxiliaries (e.g., flow agents, pigments, adhesion promoters)

Component B:

A) 0-60% aliphatic, cycloaliphatic polyamines (and/or epoxy adducts thereof)

B) 0-60% polyoxyalkyleneamines

C) 0-60% polyamides/imidazolines (and/or epoxy adducts thereof)

D) 0-60% amidoamines (and/or epoxy adducts thereof)

E) 0-60% polyoxyalkylene polyamides (and/or epoxy adducts thereof)

F) 0-60% Mannich bases or phenalkamines (and/or epoxy adducts thereof)

G) 0-10% tertiary amines

H) 0-50% organic or mineral fillers

I) additives and auxiliaries (e.g., flow agents, pigments, adhesion promoters)

Preferred polyamines for the curing agent (component B) are polyether amines such as 4,7,10-trioxa-1,13-tridecanediamine, 4,9-dioxadodecane-1,12-diamine, adducts such as 4,7,10-trioxa-1,13-tridecanediamine, 4,9-dioxadodecane-1,12-diamine, and polyoxyalkylene amines (e.g., Jeffamin® D400). Phenalkamines such as Aradur® 3460, purely aliphatic amines, or mixed aliphatic polyether structures like in Jeffamine RFD270.

In the two-component epoxy resin composition, after mixing the first component (K1) and the second component (K2), a reaction occurs which leads to the curing of the composition. In another embodiment, namely, in the one component heat-curing epoxy resin composition, the curing is effected by heating the composition to a temperature which is above the heat activation of the heat-activatable curing agent. This curing temperature is preferably a temperature in the range of 100° C. to 220° C., preferably 120 to 200° C.

The composition is ideally suited as an adhesive and is preferably used for bonding at least two substrates. The adhesives are in particular suited for automobiles or attachment or installation modules for vehicles. Furthermore, the compositions according to the invention are suitable for other areas of application. Particularly noteworthy are related applications in transport vehicle construction such as ships, trucks, buses or rail vehicles, in the construction of consumer goods such as, for example, washing machines, but also in the construction sector, for example as stiffening structural adhesives. With a composition according to the invention sealants or coatings can be realized in addition to adhesives.

The materials to be bonded or coated are preferably metals and plastics such as ABS, polyamide, polyphenylene ether, composite materials such as SMC, unsaturated polyester GFK, epoxy or acrylate composites. The application where at least one material is a metal is preferred. A particularly preferred use is the bonding of same or different metals, in particular body assembly in the automotive industry. The preferred metals are mainly steel, in particular electrolytically galvanized, hot dip galvanized, oiled steel, Bonazink-coated steel, and subsequently phosphated steel, and aluminum, in particular the types typically used in automobile construction.

EXAMPLES

Below are a few examples that further illustrate the invention, but which shall in no way limit the scope of the invention. Unless otherwise indicated, all proportions and percentages are by weight.

TABLE 1

| Starting materials used | Description | Supplier |
|---|---|---|
| PolyTHF ® 2000 | Polyol, (difunctional polybutylene glycol with a molecular mass of 2000 g/mol) | BASF |
| Poly BD ® R45V | Polyol, hydroxyl-terminated polybutadiene with a molecular mass of 2800 g/mol | Cray Valley |
| Ionol ® CP(=BHT) | stabilizer | Evonik |
| Isophorone diisocyanate (=IPDI) | Isocyanate | Evonik |
| Epikote ® 828LVEL | Standard Bisphenol A epoxy resin | Hexion |
| D.E.R. ® 331 | Standard Bisphenol A epoxy resin | Dow |
| Dibutyltin dilaurate (DBTL) | Catalyst | Thorson |
| 4-Methylphthalic anhydride 95% | Glycol scavenger | Sigma-Aldrich, Art no. 348317 |

Preparation Example 1

NCO-Terminated Prepolymer 1

700.00 g of polyTHF 2000 (OH number 57.0 mg/g KOH), 700.00 g of poly BD R45V (OH number 43.7 mg/g KOH) and 7.00 g of BHT as stabilizer were dried for 1 hour at 90° C. under vacuum. Then, 280.54 g of IPDI and 0.215 g of dibutyltin dilaurate (DBTL) were added. The reaction was carried out for 2 h at 90° C. under vacuum: measured free NCO content: 3.031% (theoretical NCO content: 3.090%).

Preparation Example 2

NCO-Terminated Prepolymer 2

350.00 g of polyTHF 2000 (OH number 55.9 mg/g KOH), 350.00 g of poly BD R45V (OH number 46 mg/g KOH) and 3.5 g of BHT as stabilizer were dried for 1 hour at 90° C. under vacuum. Then, 111.15 g of IPDI and 0,108 g of DBTL were added. The reaction was carried out for 2 h at 90° C. under vacuum: measured free NCO content: 3.237% (theoretical NCO content: 3.119%).

Example 1

Epikote® 828LVEL was dried for 2 hours at 90° C. under vacuum. 120 g of the NCO-terminated prepolymer 1 prepared in Preparation Example 1 were charged to a vessel. 428.565 g of the dried Epikote® 828LVEL were added. Then, 1.071 g of 4-methyl phthalic anhydride (0.25% by weight, based on epoxy resin) were added, followed by brief mixing. The mixture was treated with 0.110 g of DBTL and it was reacted for 2 hours in a vacuum at 110° C.

Example 2

Epikote® 828LVEL was dried for 2 hours at 90° C. under vacuum. 120 g of the NCO-terminated prepolymer 1 prepared in Preparation Example 1 were charged to a vessel. 428.565 g of the dried Epikote® 828LVEL were added. Then, 2.142 g of 4-methyl phthalic anhydride (0.5% by weight, based on epoxy resin) were added, followed by brief mixing. The mixture was treated with 0.110 g of DBTL and it was reacted for 2 hours in a vacuum at 110° C.

Example 3

Epikote® 828LVEL was dried for 2 hours at 90° C. under vacuum. 120 g of the NCO-terminated prepolymer 1 prepared in Preparation Example 1 were charged to a vessel. 428.565 g of the dried Epikote® 828LVEL were added. Then, 3.214 g of 4-methyl phthalic anhydride (0.75% by weight, based on epoxy resin) were added, followed by brief mixing. The mixture was treated with 0.110 g of DBTL and it was reacted for 2 hours in a vacuum at 110° C.

Example 4

Epikote® 828LVEL was dried for 2 hours at 90° C. under vacuum. 120 g of the NCO-terminated prepolymer 1 prepared in Preparation Example 1 were charged to a vessel. 428.565 g of the dried Epikote® 828LVEL were added. Then, 6.428 g of 4-methyl phthalic anhydride (1.5% by weight, based on epoxy resin) were added, followed by brief mixing. The mixture was treated with 0.111 g of DBTL and it was reacted for 2 hours in a vacuum at 110° C.

Example 5

Epikote® 828LVEL was dried for 2 hours at 90° C. under vacuum. 120 g of the NCO-terminated prepolymer 1 prepared in Preparation Example 1 were charged to a vessel. 513.565 g of the dried Epikote® 828LVEL were added. Then, 15.407 g of 4-methyl phthalic anhydride (3.0% by weight, based on epoxy resin) were added, followed by brief mixing. The mixture was treated with 0.130 g of DBTL and it was reacted for 3 hours in a vacuum at 110° C.

Example 6

Epikote® 828LVEL was dried for 2 hours at 90° C. under vacuum. 120 g of the NCO-terminated prepolymer 1 prepared in Preparation Example 1 were charged to a vessel. 513.565 g of the dried Epikote® 828LVEL were added. Then, 26.678 g of 4-methyl phthalic anhydride (5.0% by weight, based on epoxy resin) were added, followed by brief mixing. The mixture was treated with 0.132 g of DBTL and it was reacted for 3 hours in a vacuum at 110° C.

Comparative Example 1

Epikote® 828LVEL was dried for 2 hours at 90° C. under vacuum. 120 g of the NCO-terminated prepolymer 1 prepared in Preparation Example 1 were charged to a vessel. 428.565 g of the dried Epikote® 828LVEL were added. It was briefly mixed and the mixture was treated with 0.110 g of DBTL and it was reacted for 2 hours in a vacuum at 110° C.

Table 2 summarizes the results for Examples 1 to 6 and Comparative Example 1. As can be seen, the product could not be produced without gelling without the addition of anhydride. The significant reduction in viscosity in the reaction mixtures to which anhydride was added is also clearly apparent. The anhydride thus guarantees production by a reliable process. In the range of 0.5 to 1.5% anhydride a toughener was obtained that could be processed in liquid form even after a certain period of storage. At higher amounts of anhydride the product forms a film due to slow reaction by crosslinking reactions of the isocyanate with humidity. Although there is process reliability, however, long-term storage stability is limited.

TABLE 2

|   | Addition MPA (% by weight) | NCO (3 h) | NCO (1 d) | Viscosity (1 d) 25/50° C. [Pa * s] | EEW [g/mol] (1 d) | Appearance (1 d) | Appearance (7 d, 60° C.) |
|---|---|---|---|---|---|---|---|
| Comp. ex. 1 | — | gelling | gelling | 268/56 | 233.97 | gelling | gelling |
| Ex. 1 | 0.25 | 0.17 | 0.15 | 139/25 | 248.14 | gelling | gelling |
| Ex. 2 | 0.50 | 0.31 | 0.27 | 54/6 | 254.45 | liquid | film |
| Ex. 3 | 0.75 | 0.35 | 0.29 | 51/5 | 242.72 | liquid | film |
| Ex. 4 | 1.50 | 0.42 | 0.31 | 51/5 | 236.41 | liquid | film |
| Ex. 5 | 3.00 | 1.02 | 0.48 | 71/13 | not homogenous | thick film | thick film |
| Ex. 6 | 5.00% | 0.78 | 0.25 | 287/50 | not homogenous | thick film | thick film |

Examples 7 to 10 and Comparative Example 2

Similarly as in Examples 1 to 6 and Comparative Example 1, in Examples 7 to 10 and Comparative Example 2, an isocyanate-terminated prepolymer was blocked with an epoxy compound in the presence of MPA, wherein D.E.R.® 331 was used instead of Epikote® 828LVEL as the epoxy compound. Table 3 summarizes the results for Examples 7 to 10 and Comparative Example 2.

With all the selected anhydrides producing the impact-resistance modifier blocked with epoxy resin with a reliable process could be guaranteed. In none of the cases gelling occurred during the production of the impact-resistance modifier.

Visual Assessment of the Degree of Gelation

The rupture tendency of a material sample of each batch was used to assess the degree of gelation of each batch visually. For this purpose a wooden spatula was dipped into the batch and hand-pulled out at medium speed until the rubber-like filament ruptured. Fully gelled samples were harder and exhibited the rupture of the filament faster than elastic, less gelled batches.

Determination of the Isocyanate Content:

The isocyanate content in % by weight was determined by means of a back-titration with excess di-n-butylamine and 0.1 M hydrochloric acid. All measurements were made semi-manually on a Mettler-Toledo titrator model T70 with automatic potentiometric endpoint determination. For this purpose, 600-800 mg of the sample to be measured were dissolved with heating in a mixture of 10 ml of isopropanol and 40 ml of xylene, and then reacted with a solution of dibutylamine in xylene. Excess di-n-butylamine was titrated with 0.1 M hydrochloric acid and the isocyanate content was calculated therefrom.

TABLE 3

|  | Addition MPA (% by weight) | NCO (3 h) | NCO (1 d) | Viscosity (1 d) 25/50° C. [Pa * s] | EEW [g/mol] (1 d) | Appearance (1 d) | Appearance (7 d, 60° C.) |
|---|---|---|---|---|---|---|---|
| Comp. ex. 2 | — | gelling | gelling | 440/85 | 273.15 | gelling | gelling |
| Ex. 7 | 0.25% | 0.12% | 0.08% | 151/27 | 272.48 | gelling | gelling |
| Ex. 8 | 0.50% | 0.29% | 0.23% | 137/16 | 280.90 | liquid | gelling |
| Ex. 9 | 0.75% | 0.26% | 0.21% | 137/16 | 262.47 | liquid | film formation |
| Ex. 10 | 1.50% | 0.31% | 0.30% | 99/12 | 291.55 | liquid | thick film-gelling |

Examples 11 to 16

150 g of isocyanate-terminated prepolymer, produced from 60% by weight PolyTHF, 40% by weight poly bd R45V, IPDI (0.75 equivalents) and DBTL, was treated with 1 equivalent of dry Epikote 828LVEL. Next, 8.11 mmol anhydride were added, the reaction mixture was mixed and then reacted at 110° C. under vacuum by adding catalyst. The selected aromatic anhydrides were methyl-phthalic anyhdride (Example 11) and phthalic anhydride (Example 12), the selected cyclo-aliphatic anhydrides were methyl-hexahydrophthalic anhydride (Example 13), methyl-norbornen-2,3-dicarboxylic anhydride (Example 14), the selected succinic acid derivative with aliphatic substituent was dodecenyl-succinic anhydride (Example 15) and the selected difunctional anhydride pyromellitic anhydride (Example 16). The results are listed in Table 4.

TABLE 3

| Example | 11 | 12 | 13 | 14 | 15 | 16 |
|---|---|---|---|---|---|---|
| Anhydride used | Methyl-phthalic anhydride | Phthalic anhydride | Methyl-hexahydro phthalic anhydride | Methyl-norbornen-2,3-dicaboxylic anhydride | Dodecenyl-succinic anhydride | Pyromellitic anhydride |
| Structure of the anhydride | | | | | | |
| NCO (2 h) | 0.45% | 0.49% | 0.45% | 0.57% | 0.49 | 0.67% |
| NCO (3 h) | 0.30% | 0.34% | 0.26% | 0.42% | 0.31% | 0.55% |
| NCO (1 d) | 0.16% | 0.20% | 0.14% | 0.17% | 0.15% | 0.32% |

TABLE 3-continued

| Example | 11 | 12 | 13 | 14 | 15 | 16 |
|---|---|---|---|---|---|---|
| Viscosity 1 d 25/20 [Pa*s] | 1400/354 | 857/227 | 1380/383 | 1450/379 | 1370/396 | 841/247 |
| Gelling tendency 1 w 60° C. | gelling, soft rubber, slow rupture | gelling, soft rubber, fast rupture | gelling, soft rubber, fast rupture | gelling, soft rubber, slow rupture | gelling, soft rubber, slow rupture | gelling, hard rubber |

Viscosity Determination:

Viscosity measurements were made on a rheometer model MCR 101 of the manufacturer Anton Paar rotationally using a disk-disk geometry with the following parameters: 50 s-1 rotation, 0.2 mm gap, disk-to-disk spacing 25 mm.

Exemplary Preparation of a Two-Component Adhesive Based on a Reactive Liquid Rubber The following example will illustrate the use of a reactive liquid rubber as impact-resistance modifier further, however, shall not limit the scope of the invention in no way. The starting materials used for this are listed in Table 4.

TABLE 4

| Starting materials used | Supplier |
|---|---|
| D.E.R. ® 331 | Dow |
| Araldite ® DY 91158 | Huntsman |
| Omyacarb ® 5GU | Omya |
| Aerosil ® R202 | Evonik |
| Epoxy resin color paste Blue | Lehmann |
| Ancamine ® 1922A | Air Products |
| Ancamine ® K54 | Air Products |

For producing component A, 163.2 g of the reactive liquid rubber from Example 9 were stirred with 109.8 g of epoxy resin DER® 331, 6.0 g of the adhesive promotor Araldite® DY91158, 0.6 g of epoxy color paste Blue, 9.0 g of Omyacarb® 5GU and 12 g Aerosil® R202 in a planetary mixer at 60° C. under vacuum to form a homogeneous paste. The liquid component B was produced at room temperature by mixing 285 g of Ancamine® 1922A and 15 g of Ancamine® K 54 in a planetary mixer.

From both components, 40.0 g the finished adhesive were obtained by mixing 32.37 g of component A and 7.67 g of component B in a Speedmixer® from Hauschild model 600DAV FVZ at 2350 rpm for two minutes. The mixing ratio of 4.22 (component A) to 1 (component B) was obtained as in Table 5 by the selected 1:1 equivalent of NH equivalent mass to the epoxide equivalent mass.

TABLE 5

| | Proportion [%] |
|---|---|
| Component A | |
| D, E, R, ® 331 | 36.59 |
| Liquid rubber Example 9 | 54.41 |
| Araldite ® DY 91158 | 2.00 |
| Omyacarb ® 5GU | 3.00 |
| Aerosil ® R202 | 4.00 |
| Color paste Blue | 0.20 |
| Epoxy equivalent mass | 245.30 |

TABLE 5-continued

| | Proportion [%] |
|---|---|
| Component B | |
| Ancamine ® 1922A | 95.00 |
| Ancamine ® K54 | 5.00 |
| NH equivalent mass | 58.20 |

Immediately after mixing the adhesive formulation the test specimen for determining the tensile strength, the tensile shear strength and impact wedge-peel was prepared as described in the following test methods. After curing the test specimens according to the three curing regimens 4 h room temperature+30 min 60° C., 1 d room temperature, 7 d room temperature the values given in Table 6 were determined.

TABLE 6

| Curing | | |
|---|---|---|
| 4 h r.t. + 30 min 60° C. | ZF [MPa] | 26.34 |
| | BE[1] RT [MPa] | 14.63 |
| 1 d r.t. | ZSF [MPa] | 25.41 |
| | BE[1] RT [J] | 14.46 |
| 7 d r.t. | ZF [MPa] | 22.1 |
| | ZSF [MPa] | 27.88 |
| | BE[1] RT [J] | 14.15 |
| | BE[1] ° C. [J] | 14.51 |
| | BE[1] −30° C. [J] | 4.14 |

Tensile Shear Strength (ZSF) (DIN EN 1465)

Specimens were prepared from the example adhesive composition described using electrolytically galvanized steel H380 (EloZn) with dimensions 100×25×0.8 mm. The adhesive surface had a size of 25×10 mm at a layer thickness of 0.3 mm. The pulling speed was 10 mm/min.

Impact Wedge-Peel (ISO 11343)

Specimens were prepared from the example adhesive composition described using electrolytically galvanized steel DC04 (EloZn) with dimensions 90×20×0.8 mm, the adhesive surface had a size of 20×30 mm at a layer thickness of 0.3 mm. The measurement of the impact wedge-peel was done in each case at the specified temperatures in triplicate. The impact velocity was 2 m/s. The area under the curve (from 25% to 90%, according to ISO11343) is provided as the fracture energy (BE) in joules.

Tensile Strength (ZF) (DIN EN ISO 527)

An adhesive sample was pressed between two Teflon papers to a thickness of 2 mm. After curing, the Teflon papers were removed and the specimens punched according to DIN standard state. The specimens were measured under standard climate at a pulling speed of 2 mm/min. The tensile strength was determined according to DIN EN ISO 527.

The invention claimed is:

1. A method for producing a liquid rubber containing an epoxy group-terminated impact-resistance modifier, comprising the reaction of an isocyanate-terminated prepolymer of formula (II)

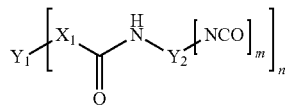
(II)

wherein
$X_1$=O, S or NH;
$Y_1$ represents an n-valent radical of a reactive polymer after removal of terminal amino, thiol or hydroxyl groups;
$Y_2$ represents a divalent radical of aliphatic, cycloaliphatic aromatic, or araliphatic diisocyanates after removal of the isocyanate groups, or a trivalent radical of trimers or biurets of aliphatic, cycloaliphatic, aromatic or araliphatic diisocyanates after removal of the isocyanate groups;
m=1 or 2; and
n=2, 3 or 4; with at least one epoxy resin, comprising an epoxy compound containing a primary or secondary hydroxyl group of formula (III)

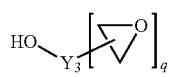
(III)

wherein $Y_3$ represents a radical of an aliphatic, cycloaliphatic, aromatic or araliphatic epoxy containing a primary or secondary hydroxyl group after removal of the epoxide groups and the primary or secondary hydroxyl group; and
q=1, 2 or 3;
in the presence of at least one compound selected from the group consisting of anhydrides and aldehydes as glycol scavenger, wherein the isocyanate-terminated prepolymer of formula (II), the epoxy resin and the glycol scavenger are mixed with one another or the epoxy resin is reacted with the glycol scavenger before they are mixed with the isocyanate-terminated prepolymer of formula (II).

2. The method according to claim 1, wherein the isocyanate-terminated prepolymer of formula (II) can be obtained by reacting a $X_1$H-group-bearing prepolymer selected from polyether polyols, polybutadiene polyols, polyester polyols, polycarbonate polyols, NH-terminated polyether and mixtures thereof with one or more polyisocyanates.

3. The method according to claim 1, wherein the epoxy resin comprises a reaction product of at least one epoxy and at least one diol, triol or higher valent polyol or a reaction product of an epoxy resin and at least one monophenol.

4. The method according to claim 1, wherein the epoxy resin is selected from a bisphenol A diglycidyl ether product, a bisphenol F diglycidyl ether product or a bisphenol A/F diglycidyl ether product.

5. The method according to claim 1, wherein the epoxy compound of formula (III) is selected from trimethylolpropane diglycidyl ether, dimer of bisphenol A diglycidyl ether, dimer of bisphenol F diglycidyl ether, dimer of bisphenol A/F diglycidyl ether, or mixtures thereof.

6. The method according to claim 1, wherein the epoxy resin comprises a compound of formula (VI) as hydroxy-epoxy compound of formula (III)

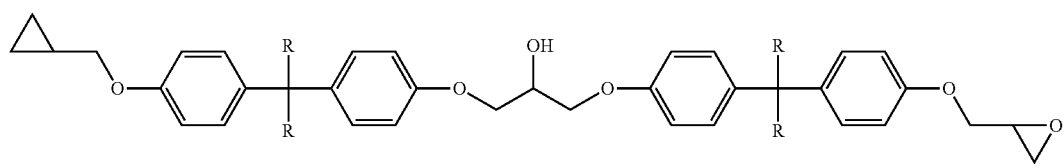
(VI)

wherein R is independently H or methyl.

7. The method according to claim 1, wherein the glycol scavenger is an anhydride.

8. The method according to claim 1, wherein the anhydride is selected from at least one cyclic carboxylic anhydride.

9. The method according to claim 1, wherein the isocyanate groups of the isocyanate-terminated prepolymer of formula (II) are partially or completely blocked by the reaction with the epoxy compound (III).

10. The method according to claim 1, wherein the amount of glycol scavenger used is in the range of 0.25 to 3.00% by weight, based on the amount of epoxy resin.

11. The method according to claim 1, wherein the isocyanate-terminated prepolymer of formula (II) can be obtained by reacting a $X_1$H group-bearing prepolymer, one or more polyisocyanate and at least one polyphenol.

12. The method according to claim 1, wherein the isocyanate-terminated prepolymer of formula (II) is obtained by reaction of at least two polyols with one or more polyisocyanates, wherein at least one polyether polyol and at least one OH-terminated rubber are used as polyols.

13. Liquid rubber containing an epoxy-terminated impact-resistance modifier obtained by a method according to claim 1.

14. A method of increasing the impact strength of a cured epoxy resin matrix by mixing a liquid rubber according to claim 13 into a one-component or two-component epoxy resin composition comprising an epoxy resin and a curing agent, and curing.

15. One-component or two-component epoxy resin composition comprising at least one liquid rubber according to claim 13.

16. One-component or two-component epoxy resin composition according to claim 15, comprising
a) at least one epoxy resin (A); and
b) said liquid rubber.

17. One-component or two-component epoxy resin composition according to claim 15, wherein it is a one-component or two-component epoxy resin adhesive.

* * * * *